United States Patent
Ishii et al.

(10) Patent No.: US 12,526,516 B2
(45) Date of Patent: Jan. 13, 2026

(54) CONTROL DEVICE AND CONTROL METHOD

(71) Applicant: Panasonic Intellectual Property Corporation of America, Torrance, CA (US)

(72) Inventors: Yasunori Ishii, Osaka (JP); Satoshi Sato, Kyoto (JP); Kunio Nobori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 267 days.

(21) Appl. No.: 18/220,107

(22) Filed: Jul. 10, 2023

(65) Prior Publication Data

US 2023/0353870 A1  Nov. 2, 2023

Related U.S. Application Data

(63) Continuation of application No. PCT/JP2021/043645, filed on Nov. 29, 2021.

(30) Foreign Application Priority Data

Jan. 12, 2021 (JP) .................................. 2021-002889

(51) Int. Cl.
*H04N 23/67* (2023.01)
*G02B 5/00* (2006.01)
*G06T 7/50* (2017.01)

(52) U.S. Cl.
CPC ............. *H04N 23/67* (2023.01); *G02B 5/005* (2013.01); *G06T 7/50* (2017.01); *G06T 2207/20081* (2013.01); *G06T 2207/30196* (2013.01)

(58) Field of Classification Search
CPC ............... H04N 23/632; H04N 13/239; H04N 23/687; H04N 23/45; H04N 23/635;
(Continued)

(56) References Cited

U.S. PATENT DOCUMENTS 11,308,338 B2 * 4/2022 Yang ..................... G01S 7/4052
11,409,019 B1 * 8/2022 Gonzales ......... G01N 23/20066
(Continued)

FOREIGN PATENT DOCUMENTS

JP  2015-133594  7/2015
JP  2016-506669  3/2016
(Continued)

OTHER PUBLICATIONS

Sato et al., "Cognitive Sensing: Depth Estimation with Multi-Pinhole Camera using Deep Learning", Panasonic Technical Journal, vol. 64, No. 1, May 1, 2018, pp. 33-38, along with an English translation of the Abstract.
(Continued)

*Primary Examiner* — Lin Ye
*Assistant Examiner* — Tuan H Le
(74) *Attorney, Agent, or Firm* — Greenblum & Bernstein, P.L.C.

(57) ABSTRACT

A control device includes: an image acquisition unit that acquires an image obtained by imaging by an imaging device in which a mask having a plurality of pinholes is arranged so as to cover a light receiving surface of an imaging element; a control unit that controls at least one of a size and an interval of two pinholes among the plurality of pinholes based on the image; and an output unit that outputs an image obtained by the imaging device after at least one of the size and the interval of the two pinholes is controlled.

11 Claims, 11 Drawing Sheets

(58) Field of Classification Search
CPC ........ H04N 23/69; H04N 23/90; H04N 23/55; H04N 23/67
See application file for complete search history.

(56) References Cited

U.S. PATENT DOCUMENTS

| | | |
|---|---|---|
| 2014/0176663 A1 | 6/2014 | Cutler et al. |
| 2015/0334348 A1 | 11/2015 | Cutler et al. |
| 2016/0316142 A1 | 10/2016 | Sangu |
| 2017/0301067 A1 | 10/2017 | Cutler et al. |
| 2018/0365809 A1 | 12/2018 | Cutler et al. |
| 2019/0347520 A1 | 11/2019 | Sato et al. |
| 2020/0358926 A1 | 11/2020 | Iwase et al. |

FOREIGN PATENT DOCUMENTS

| | | |
|---|---|---|
| JP | 2016-134732 | 7/2016 |
| JP | 2019-200769 | 11/2019 |
| JP | 2019-200772 | 11/2019 |
| WO | 2019/078337 | 4/2019 |

OTHER PUBLICATIONS

International Search Report issued in International Pat. Appl. No. PCT/JP2021/043645, dated Mar. 1, 2022, along with an English translation thereof.

\* cited by examiner

CONTROL DEVICE AND CONTROL METHOD

FIELD OF INVENTION

The present disclosure relates to a technique for controlling an imaging device in which a mask having a plurality of pinholes is arranged so as to cover a light receiving surface of an imaging element.

BACKGROUND ART

For example, Patent Literature 1 discloses a system that performs an action including a stage of automatically determining a region of interest in a foreground of a scene obtained by a privacy camera, a stage of deciding one privacy mode from a plurality of privacy modes including background blurring and background replacement, a stage of generating an image by setting a depth of field of the privacy camera so that an object of interest in the scene in the foreground appears to be in focus and an object in a background of the scene appears to be out of focus when the decided privacy mode is the background blurring, and a stage of displaying the image.

However, in the above-described conventional technique, when the object of interest in the foreground moves to the background, it appears that an object, which is a privacy protection target, in the background, is also in focus, so that it is difficult to protect privacy of a subject.

Patent Literature 1: JP 2016-506669 A

SUMMARY OF THE INVENTION

The present disclosure has been made to solve the above problem, and an object of the present disclosure is to provide a technique enabling protection of privacy of a subject even when a distance from an imaging device to the subject changes.

A control device according to one aspect of the present disclosure includes: an acquisition unit that acquires an image obtained by imaging by an imaging device in which a mask having a plurality of pinholes is arranged so as to cover a light receiving surface of an imaging element; a control unit that controls at least one of a size and an interval of two pinholes among the plurality of pinholes based on the image; and an output unit that outputs an image obtained by the imaging device after at least one of the size and the interval of the two pinholes is controlled.

According to the present disclosure, it is possible to protect privacy of a subject even when a distance from an imaging device to the subject changes.

DETAILED DESCRIPTION

Knowledge Underlying Present Disclosure

Figure 1:
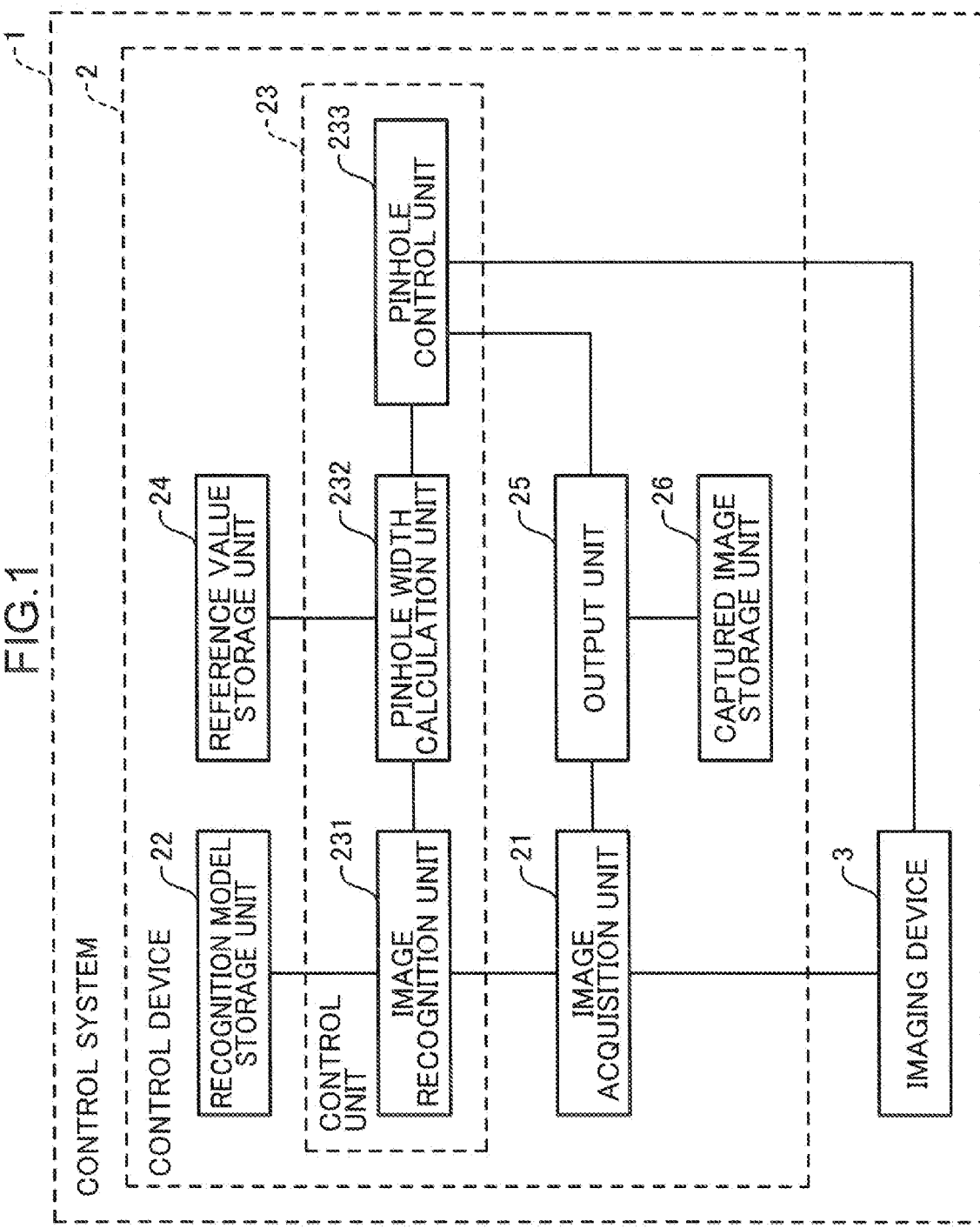
FIG. 1 is a block diagram illustrating an example of an overall configuration of a control system in a first embodiment of the present disclosure.

Various recognition techniques are important in home, indoor, or the like, such as behavior recognition of a person and character recognition of an apparatus operator. In recent years, a technique called deep learning has attracted attention for object recognition. The deep learning is machine learning using a neural network having a multilayer structure, and by using a large amount of training data, the deep learning enables more accurate recognition performance to be realized than by a conventional method. In such object recognition, image information is particularly effective. Various methods have been proposed for greatly improving a conventional object recognition capability by using a camera as an input device and performing deep learning using image information as an input.

Unfortunately, disposing a camera in home or the like causes a problem that privacy is violated when a captured image leaks to the outside due to hacking or the like. Thus, a countermeasure is required to protect privacy of a subject even when a captured image leaks to the outside.

In addition, although a camera is arranged also outdoors or in a store for the purpose of collecting big data or the like, from the viewpoint of protecting privacy, it is not preferable to collect an image of a face or the like that enables identification of an individual.

As described above, in conventional techniques, when an object of interest in the foreground moves to the background, an object in the background, which is a privacy protection target, also appears to be in focus, so that it is difficult to sufficiently protect privacy of a subject. Therefore, in the conventional techniques, a countermeasure is required for protecting privacy of a subject in a case where a distance from an imaging device to the subject changes. Here, a subject represents a privacy protection target.

For example, as a camera for obtaining a blurred image from which a person has difficulty in visually recognizing a subject, there is provided a multi-pinhole camera. The multi-pinhole camera intentionally creates a blurred image by superimposing a plurality of images having different viewpoints. Note that the multi-pinhole camera is disclosed in Literature "Cognitive sensing: Depth Estimation with Multi-Pinhole Camera using Deep Learning" (Satoshi Sato et al., Panasonic Technical Journal, issued on May 15, 2018, Vol. 64, No. 1, 33-38 pages).

In the multi-pinhole camera, in a case where a distance between the multi-pinhole camera and a subject is relatively long, a plurality of subject images are superimposed, so that an image from which a person has difficulty in visually recognizing the subject is obtained. On the other hand, in a case where the distance between the multi-pinhole camera and the subject is relatively short, a deviation amount between the plurality of subject images becomes too large, and as a result, a superimposed area is reduced, so that an image from which a person can visually recognize the subject might be obtained.

Thus, an image obtained by a multi-pinhole camera might not sufficiently protect privacy of a subject depending on a distance between the multi-pinhole camera and the subject.

In order to solve the above problem, a control device according to one aspect of the present disclosure includes: an acquisition unit that acquires an image obtained by imaging by an imaging device in which a mask having a plurality of pinholes is arranged so as to cover a light receiving surface of an imaging element; a control unit that controls at least one of a size and an interval of two pinholes among the plurality of pinholes based on the image; and an output unit that outputs an image obtained by the imaging device after at least one of the size and the interval of the two pinholes is controlled.

According to this configuration, at least one of the size and the interval of the two pinholes among the plurality of pinholes is controlled based on an image obtained by imaging by the imaging device in which the mask having the plurality of pinholes is arranged so as to cover the light receiving surface of the imaging element. Accordingly, by controlling at least one of the size and the interval of the two pinholes among the plurality of pinholes based on the image, an image from which a person has difficulty in visually recognizing a subject is obtained, so that privacy of the subject can be protected even when a distance from the imaging device to the subject changes.

In addition, in the above-described control device, the control unit may calculate a distance between a subject appearing in the image and the imaging device, and control at least one of the size and the interval of the two pinholes based on the distance.

As the subject approaches the imaging device, an overlapping degree of subject images on the light receiving surface of the imaging element decreases, so that an image from which a person can visually recognize the subject is obtained. However, according to this configuration, since at least one of the size and the interval of the two pinholes is controlled based on the distance between the subject appearing in the image and the imaging device, it is possible to obtain an image from which a person has difficulty in visually recognizing the subject even when the distance between the subject and the imaging device changes.

In addition, in the above-described control device, the control unit may calculate the distance by inputting the acquired image to an estimation model trained using machine learning so as to use the image showing the subject as an input and to output the distance between the subject and the imaging device.

According to this configuration, since the distance is calculated by inputting the acquired image to the estimation model trained using machine learning so as to use the image showing the subject as an input and to output the distance between the subject and the imaging device, the distance between the subject and the imaging device can be easily calculated from the image.

In the above-described control device, when controlling the size, the control unit may increase the size as the distance is shorter, and when controlling the interval, may decrease the interval as the distance is shorter.

According to this configuration, in a case of controlling the sizes of the two pinholes, the sizes of the two pinholes are controlled to be larger as the distance between the subject and the imaging device becomes shorter, and in a case of controlling the interval between the two pinholes, the interval between the two pinholes is controlled to be shorter as the distance between the subject and the imaging device becomes shorter. Accordingly, even when the subject approaches the imaging device, it is possible to obtain an image from which a person has difficulty in visually recognizing the subject.

In addition, in the above-described control device, the control unit may calculate an interval to be controlled between the two pinholes based on the image, and in a case where the calculated interval is shorter than a threshold, may make the size larger and in a case where the calculated interval is equal to or longer than the threshold, may decrease the interval.

As the interval between the two pinholes becomes shorter, the overlapping degree of the two subject images on the light receiving surface of the imaging element becomes higher, so that the two subject images might substantially overlap into one to allow a person to visually recognize the subject. However, according to this configuration, when the calculated interval is shorter than the threshold, the interval of the two pinholes is not controlled, but the size of the two pinholes is controlled to be larger. Therefore, even when the interval of the two pinholes decrease and the overlapping degree between the two subject images on the light receiving surface of the imaging element increases, it is possible to obtain an image from which a person has difficulty in visually recognizing a subject.

In addition, in the above-described control device, the control unit may calculate a degree of blurring of the subject appearing in the image and control at least one of the size and the interval of the two pinholes based on the degree of blurring.

According to this configuration, in a case where the degree of blurring of the subject appearing in the image is a degree of blurring that allows a person to visually recognize the subject, at least one of the size and the interval of the two pinholes is controlled, so that it is possible to obtain an image from which a person has difficulty in visually recognizing the subject.

In addition, in the above-described control device, after controlling one of the size and the interval of the two pinholes, the control unit may calculate the degree of blurring of the subject appearing in the image, and in a case where the degree of blurring is equal to or lower than a threshold, may control uncontrolled one of the size and the interval of the two pinholes.

According to the this configuration, even if the degree of blurring of the subject appearing in the image is equal to or lower than the threshold after one of the size and the interval of the two pinholes is controlled, the uncontrolled one of the size and the interval of the two pinholes is controlled, so that the degree of blurring of the subject appearing in the image can be increased, thereby enabling an image from which a person has difficulty in visually recognizing the subject to be obtained.

In addition, in the above-described control device, the control unit may calculate the degree of blurring by inputting the acquired image to an estimation model trained using machine learning so as to use the image showing the subject as an input and to output the degree of blurring of the subject appearing in the image.

According to this configuration, since the degree of blurring is calculated by inputting the acquired image to the estimation model trained using machine learning so as to use the image showing the subject as an input and to output the degree of blurring of the subject appearing in the image, the degree of blurring of the subject can be easily calculated from the image.

In addition, in the above-described control device, in a case where a plurality of subjects are appearing in the image, the control unit may calculate a distance between each of the plurality of subjects and the imaging device, and may control at least one of the size and the interval of the two pinholes based on the distance between the subject having the shortest calculated distance and the imaging device.

According to this configuration, even in a case where a plurality of subjects appear in the image, at least one of the size and the interval of the two pinholes is controlled based on the distance between the subject closest to the imaging device and the imaging device, so that the degrees of blurring of all the subjects appearing in the image can be increased, thereby enabling an image from which a person has difficulty in visually recognizing the subject to be obtained.

In addition, in the above-described control device, the image output by the output unit may be a new image obtained by new imaging by the imaging device and acquired by the acquisition unit after at least one of the size and the interval of the two pinholes is controlled by the control unit.

In addition, the present disclosure can be implemented not only as a control device having such a characteristic configuration as described above, but also as a control method or the like of executing characteristic processing corresponding to a characteristic configuration provided in a control system. The present disclosure can also be implemented as a computer program that causes a computer to execute the characteristic processing included in such a control method.

Accordingly, even according to other aspect below, the same effect as by the above-described control device can be achieved.

A control method according to another aspect of the present disclosure includes, by a computer: acquiring an image obtained by imaging by an imaging device in which a mask having a plurality of pinholes is arranged so as to cover a light receiving surface of an imaging element; controlling at least one of a size and an interval of two pinholes among the plurality of pinholes based on the image; and outputting an image obtained by the imaging device after at least one of the size and the interval of the two pinholes is controlled.

Each of embodiments to be described below illustrates a specific example of the present disclosure. Numerical values, shapes, constituent elements, steps, order of steps, and the like shown in the embodiments below are merely examples, and are not intended to limit the present disclosure. Furthermore, among constituent elements in the embodiments below, a constituent element that is not described in an independent claim indicating the highest concept will be described as an optional constituent element. In all the embodiments, respective contents can be combined.

First Embodiment

FIG. 1 is a block diagram illustrating an example of an overall configuration of a control system 1 according to a first embodiment of the present disclosure. The control system 1 includes a control device 2 and an imaging device 3.

Unlike an ordinary camera that captures an ordinary image without blurring, the imaging device 3 captures an image with blurring. An image obtained by the imaging device 3 is an image from which due to intentionally created blurring, a person cannot recognize a subject even when the person sees the image itself.

The imaging device 3 is, for example, a multi-pinhole camera in which a mask having a mask pattern having a plurality of pinholes formed is arranged so as to cover a light receiving surface of an imaging element. In other words, it can be said that the mask pattern is arranged between a subject and the light receiving surface.

Figure 2:
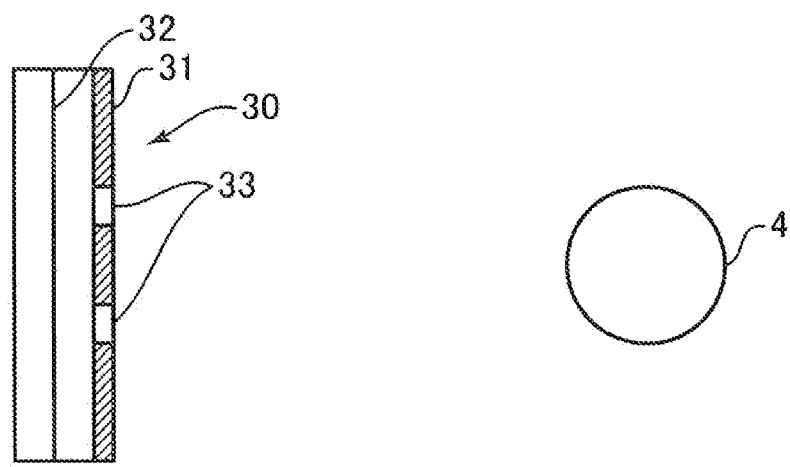
FIG. 2 is a view schematically illustrating a structure of a multi-pinhole camera as one example of an imaging device.

FIG. 2 is a view schematically illustrating a structure of a multi-pinhole camera 30 as one example of the imaging device 3. FIG. 2 is a top view of the multi-pinhole camera 30 and a subject 4 as a person.

The multi-pinhole camera 30 illustrated in FIG. 2 includes a multi-pinhole mask 31, and an imaging element 32 such as a CMOS. The multi-pinhole mask 31 is arranged at a predetermined distance from a light receiving surface of the imaging element 32. The multi-pinhole mask 31 has a plurality of pinholes 33 arranged at random or at equal intervals. The imaging element 32 acquires a captured image obtained by imaging the subject 4 through each pinhole 33. The image acquired through the pinholes is referred to as a pinhole image.

Since the pinhole image varies with a position and a size of each pinhole 33, the imaging element 32 acquires a superimposed image (multiple image) in a state in which a plurality of pinhole images are overlapped with each other while being slightly shifted. A positional relationship among the plurality of pinholes 33 affects a positional relationship among the plurality of pinhole images projected on the imaging element 32 (i.e., a degree of superimposition of a multiple image), and a size of each pinhole 33 affects a degree of blurring of a pinhole image.

Using the multi-pinhole mask 31 enables acquiring a plurality of pinhole images each having a different position and a different degree of blurring while superimposing the images. In other words, a captured image in which a multiple image and blurring are intentionally created can be acquired. Thus, a captured image is a multiple and blurred image, whose blurring enables acquisition of an image in which privacy of a subject is protected.

The multi-pinhole mask 31 is a liquid crystal mask using a spatial light modulator or the like. By using a liquid crystal mask as the multi-pinhole mask 31, a transmittance at each position in the mask can be arbitrarily set, and the position and the size (opening area) of the pinhole 33 can be changed.

In addition, desirably, the multi-pinhole camera 30 does not include an optical system (a lens, a prism, a mirror, or the like) for forming an image of a light from a subject onto the imaging element 32. By omitting the optical system, it is possible to reduce a size and a weight of the multi-pinhole camera 30, reduce costs, and improve designability.

Although in FIG. 2, two pinholes 33 are arranged side by side in a horizontal direction, the present disclosure is not particularly limited thereto, and the multi-pinhole camera 30 may include three or more pinholes 33.

Next, a distance between the multi-pinhole mask 31 and the subject 4 and an overlapping degree of subject images on the imaging element 32 will be described.

Figure 3:
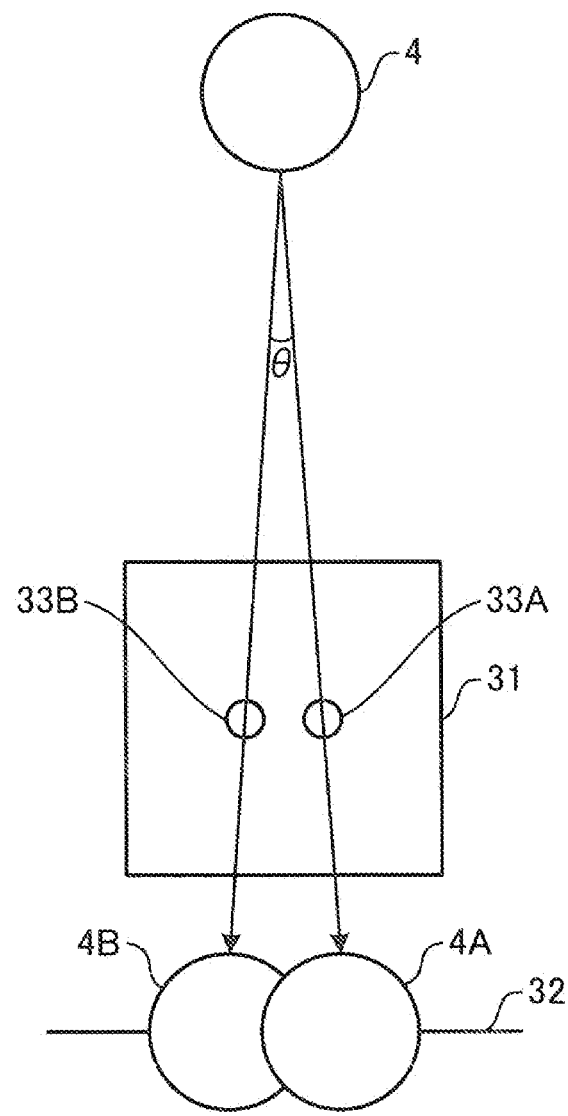
FIG. 3 is a view illustrating a subject image formed on a light receiving surface of an imaging element in a case where a distance between a multi-pinhole mask and a subject is relatively long.
Figure 4:
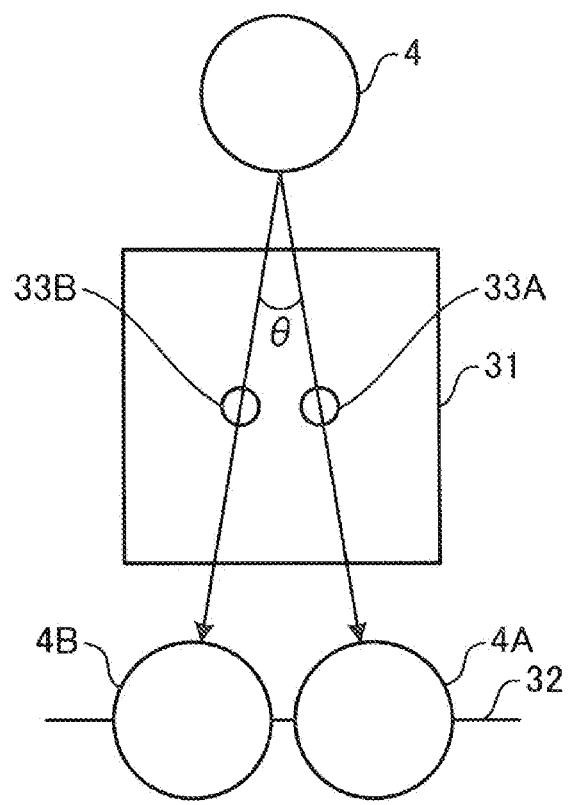
FIG. 4 is a view illustrating a subject image formed on the light receiving surface of the imaging element in a case where the distance between the multi-pinhole mask and the subject is relatively short.

FIG. 3 is a view illustrating a subject image formed on the light receiving surface of the imaging element 32 in a case where the distance between the multi-pinhole mask 31 and the subject 4 is relatively long, and FIG. 4 is a view illustrating a subject image formed on the light receiving surface of the imaging element 32 in a case where the distance between the multi-pinhole mask 31 and the subject 4 is relatively short.

The multi-pinhole mask 31 includes a first pinhole 33A and a second pinhole 33B arranged side by side in the horizontal direction. The first pinhole 33A forms a first subject image 4A on the light receiving surface of the imaging element 32, and the second pinhole 33B forms a second subject image 4B on the light receiving surface of the imaging element 32.

As illustrated in FIG. 3, when the distance between the multi-pinhole mask 31 and the subject 4 is relatively long, an angle θ formed by a light incident on the first pinhole 33A and a light incident on the second pinhole 33B becomes small, and an overlapping degree between the first subject image 4A and the second subject image 4B becomes high. As a result, the captured image obtained by the imaging element 32 becomes an unclear image in which two subject images whose positions are shifted overlap with each other, the image enabling satisfactory privacy protection.

By contrast, as illustrated in FIG. 4, when the distance between the multi-pinhole mask 31 and the subject 4 is short, the angle θ formed by the light incident on the first pinhole 33A and the light incident on the second pinhole 33B becomes large, and the overlapping degree between the first subject image 4A and the second subject image 4B becomes low. As a result, the captured image obtained by the imaging element 32 becomes an image in which the subject 4 can be recognized, the image making privacy hard to be protected.

When the distance between the multi-pinhole mask 31 and the subject 4 becomes relatively short, and the angle θ formed by the light incident on the first pinhole 33A and the light incident on the second pinhole 33B becomes large, an interval between the first subject image 4A and the second subject image 4B formed on the light receiving surface of the imaging element 32 becomes long. As a result, the overlap between the first subject image 4A and the second subject image 4B is reduced. By contrast, when the distance between the multi-pinhole mask 31 and the subject 4 is relatively long, and the angle θ formed by the light incident on the first pinhole 33A and the light incident on the second pinhole 33B becomes small, the interval between the first subject image 4A and the second subject image 4B formed on the light receiving surface of the imaging element 32 becomes short. As a result, the overlap between first subject image 4A and second subject image 4B is increased.

In other words, even when the distance between the multi-pinhole mask 31 and the subject 4 is relatively short, by decreasing an interval between the first pinhole 33A and the second pinhole 33B, the angle θ formed by the light incident on the first pinhole 33A and the light incident on the second pinhole 33B becomes small to increase the overlap between the first subject image 4A and the second subject image 4B.

Therefore, the control device 2 in the first embodiment controls at least one of the size and the interval of two pinholes among the plurality of pinholes according to a distance between a subject appearing in an image and the imaging device 3.

Specifically, the control device 2 includes a microprocessor, a random access memory (RAM), a read only memory (ROM), a hard disk, and the like (not illustrated). The RAM, the ROM, or the hard disk stores a computer program, and the microprocessor operates according to the computer program to implement functions of the control device 2.

The control device 2 includes an image acquisition unit 21, a recognition model storage unit 22, a control unit 23, a reference value storage unit 24, an output unit 25, and a captured image storage unit 26.

The image acquisition unit 21 acquires an image obtained by imaging by the imaging device 3 in which the multi-pinhole mask 31 having the plurality of pinholes 33 is arranged so as to cover the light receiving surface of the imaging element 32. The image acquisition unit 21 outputs an acquired image to an image recognition unit 231 of the control unit 23 and to the output unit 25.

The recognition model storage unit 22 stores in advance a recognition model (estimation model) trained using machine learning so as to use an image showing the subject 4 obtained by the imaging device 3 as an input and to output a distance between the subject 4 and the imaging device 3. Note that the distance between the subject 4 and the imaging device 3 may be a distance between the subject 4 and the multi-pinhole mask 31 or a distance between the subject 4 and the light receiving surface of the imaging element 32. In addition, the distance between the subject 4 and the multi-pinhole mask 31 may be a length of a perpendicular drawn from the subject 4 to a surface including a surface of the multi-pinhole mask 31. In addition, the distance between the subject 4 and the light receiving surface of the imaging element 32 may be a length of a perpendicular drawn from the subject 4 to a surface including the light receiving surface of the imaging element 32.

In addition, as the machine learning, for example, supervised learning is used, where a relationship between an input and an output is learned using training data having a label (output information) applied to input information. Note that as the machine learning, for example, unsupervised learning, where a structure of data is constructed only with an unlabeled input, semi-supervised learning, where both labeled and unlabeled data are handled, reinforcement learning, where behavior that maximizes reward is learned by trial and error, and the like may be used. In addition, specific methods of machine learning include a neural network (including deep learning using a multilayer neural network), genetic programming, a decision tree, a Bayesian network, and a support vector machine (SVM). In the machine learning of the present disclosure, for example, a deep neural network (DNN) or a convolutional neural network (CNN) is used.

The control unit 23 controls an interval between two pinholes (hereinafter, also referred to as a pinhole width) among the plurality of pinholes based on an image acquired by the image acquisition unit 21. The control unit 23 calculates the distance between the subject 4 appearing in the image and the imaging device 3, and controls the interval between the two pinholes based on the distance. The control unit 23 decreases the interval between the two pinholes as the distance between the subject 4 and the imaging device 3 becomes shorter.

The control unit 23 includes the image recognition unit 231, a pinhole width calculation unit 232, and a pinhole control unit 233.

The image recognition unit 231 calculates the distance between the subject 4 appearing in an image and the imaging device 3. The image recognition unit 231 calculates (estimates) the distance between the subject 4 and the imaging device 3 by inputting an image acquired by the image acquisition unit 21 to a recognition model read from the recognition model storage unit 22.

The reference value storage unit 24 stores in advance a reference pinhole width and a reference distance used when calculating a pinhole width according to a distance between the subject 4 and the imaging device 3. Here, the reference pinhole width and the reference distance will be described.

Figure 5:
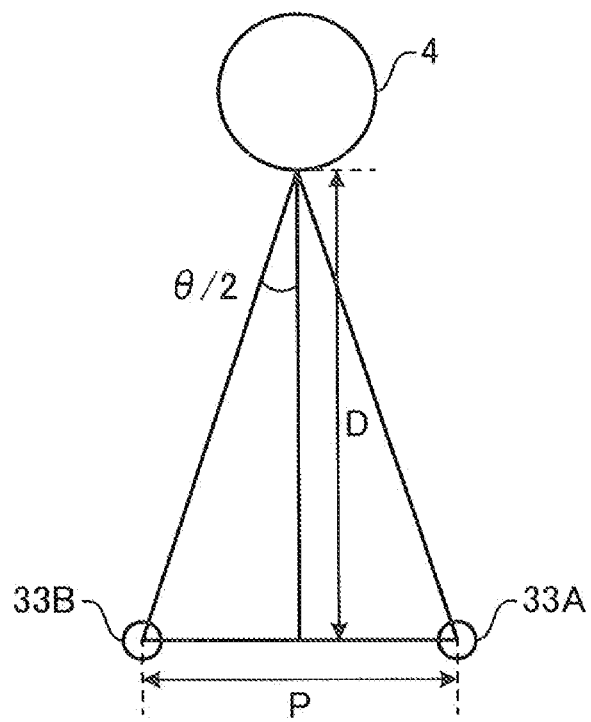
FIG. 5 is a schematic view for describing a reference pinhole width and a reference distance.

FIG. 5 is a schematic view for describing a reference pinhole width and a reference distance.

The pinhole width represents an interval between two pinholes of the plurality of pinholes. For example, the pinhole width represents an interval between the center of the first pinhole 33A and the center of the second pinhole 33B. A reference pinhole width P is set in advance. Reference sizes (reference diameters or reference opening areas) of two pinholes among the plurality of pinholes are also set in advance. Although the overlapping degree with which privacy is sufficiently protected depends on a position and a size of the pinhole, it is assumed that privacy is protected in a case where subject images on the light receiving surface of the imaging element 32 are superimposed at a predetermined overlapping degree. The predetermined overlapping degree is, for example, 50%.

The distance between the subject 4 and the multi-pinhole mask 31 when the subject images are superimposed at an overlapping degree of 50% is set as a reference distance D. In a case where the interval between the first pinhole 33A and the second pinhole 33B is a reference pinhole width P, when the distance between the subject 4 and the multi-pinhole mask 31 becomes longer than the reference distance D, the overlapping degree of the subject images becomes higher than 50%. In addition, in a case where the interval between the first pinhole 33A and the second pinhole 33B is the reference pinhole width P, when the distance between the subject 4 and the multi-pinhole mask 31 becomes shorter than the reference distance D, the overlapping degree of the subject images becomes lower than 50%.

The reference value storage unit 24 stores the reference pinhole width P and the reference distance D in advance. In addition, an initial interval between the first pinhole 33A and the second pinhole 33B is set to the reference pinhole width P. Furthermore, the reference value storage unit 24 also stores the reference size of the pinhole in advance. An initial size of each of the first pinhole 33A and the second pinhole 33B is set to the reference size.

When the multi-pinhole mask 31 has three or more pinholes, an interval between the pinholes having the largest interval therebetween is set to the reference pinhole width P.

The pinhole width calculation unit 232 calculates a pinhole width for superimposing subject images based on the distance between the subject 4 and the imaging device 3 calculated by the image recognition unit 231 and on the reference pinhole width P and the reference distance D stored in the reference value storage unit 24.

Figure 6:
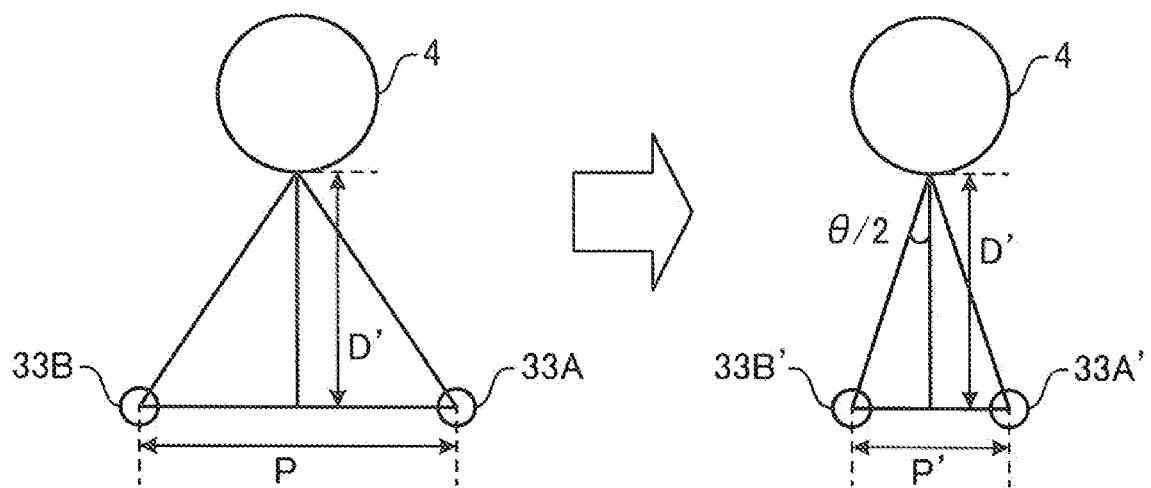
FIG. 6 is a schematic view for describing a method of calculating a pinhole width in the first embodiment.

FIG. 6 is a schematic view for describing a method of calculating a pinhole width in the first embodiment.

The reference pinhole width P, the reference distance D, and the reference angle θ formed by the light incident on the first pinhole 33A and the light incident on the second pinhole 33B have the following relationship.

$$\tan(\theta/2)=(P/2)/D=P/2D$$

$$\mathrm{atan}(P/2D)=\theta/2$$

When an estimated distance D'(D'<D) between the subject 4 and the imaging device 3 is calculated by the image recognition unit 231, a pinhole width P' satisfying the reference angle θ is expressed by the following equation.

$$\mathrm{atan}(P'/2D')=\theta/2$$

$$\mathrm{atan}(P/2D)=\mathrm{atan}(P'/2D')$$

$$P/2D=P'/2D'$$

$$P'=PD'/D$$

Since the reference pinhole width P and the reference distance D are known, when the estimated distance D' between the subject 4 and the imaging device 3 is calculated, the pinhole width P' that is an interval between a first pinhole 33A' and a second pinhole 33B' enabling protection of privacy is calculated. Accordingly, the pinhole width calculation unit 232 calculates the pinhole width P' by multiplying the distance D' between the subject 4 and the imaging device 3 calculated by the image recognition unit 231 by the reference pinhole width P and dividing the multiplied value by the reference distance D.

When the multi-pinhole mask 31 has three or more pinholes, the pinhole width calculation unit 232 calculates an interval between pinholes having the largest interval therebetween.

The pinhole control unit 233 controls an interval between two pinholes of the plurality of pinholes. The pinhole control unit 233 changes the interval between the two pinholes so as to have the pinhole width calculated by the pinhole width calculation unit 232. When the calculated pinhole width is the same as a current pinhole width, the pinhole control unit 233 maintains a current interval between the two pinholes without changing the interval between the two pinholes. When the calculated pinhole width is different from the current pinhole width, the pinhole control unit 233 changes the current pinhole width to the calculated pinhole width.

When changing the pinhole width, the pinhole control unit 233 changes a transmittance of the multi-pinhole mask 31, which is a liquid crystal mask, so as to form two pinholes of a predetermined size (reference size) at positions corresponding to the calculated pinhole width. The pinhole control unit 233 outputs a mask control signal for changing the current pinhole width to the calculated pinhole width to the multi-pinhole mask 31.

The pinhole control unit 233 also outputs a control confirmation signal indicating whether or not the interval between the two pinholes has been controlled to the output unit 25.

The output unit 25 outputs an image obtained by the imaging device 3 after the interval between the two pinholes is controlled to the captured image storage unit 26. In other words, the output unit 25 stores, in the captured image storage unit 26, the image obtained by the imaging device 3 after the interval between the two pinholes is controlled.

In a case where the control confirmation signal indicating that the interval between the two pinholes has been controlled is input, the output unit 25 does not output the image obtained by the imaging device 3 to the captured image storage unit 26. In other words, when the interval between the two pinholes is changed, the image used for image recognition has a low degree of blurring, and there is a possibility that privacy cannot be protected. Therefore, when the interval between the two pinholes is changed, the output unit 25 discards the image obtained by the imaging device 3 without outputting the image to the captured image storage unit 26.

On the other hand, when the control confirmation signal indicating that the interval between the two pinholes has not been controlled is input, the output unit 25 outputs the image obtained by the imaging device 3 to the captured image storage unit 26. Specifically, since when the interval between the two pinholes has not been changed, the interval between the two pinholes has been already changed, the image used for the image recognition has an appropriate degree of blurring, so that privacy can be protected. Therefore, when the interval between the two pinholes has not been changed, the output unit 25 outputs the image obtained by the imaging device 3 to the captured image storage unit 26.

The captured image storage unit 26 stores the image obtained by the imaging device 3. At this time, the image to be stored in the captured image storage unit 26 is a blurred image that enables protection of privacy.

Although in the first embodiment, the control device 2 includes the captured image storage unit 26, the present disclosure is not particularly limited thereto, and an external computer connected to the control device 2 via a network may include the captured image storage unit 26. In this case, the output unit 25 may transmit an image obtained by the imaging device 3 to the external computer.

Next, control processing in the control device 2 according to the first embodiment of the present disclosure will be described.

Figure 7:
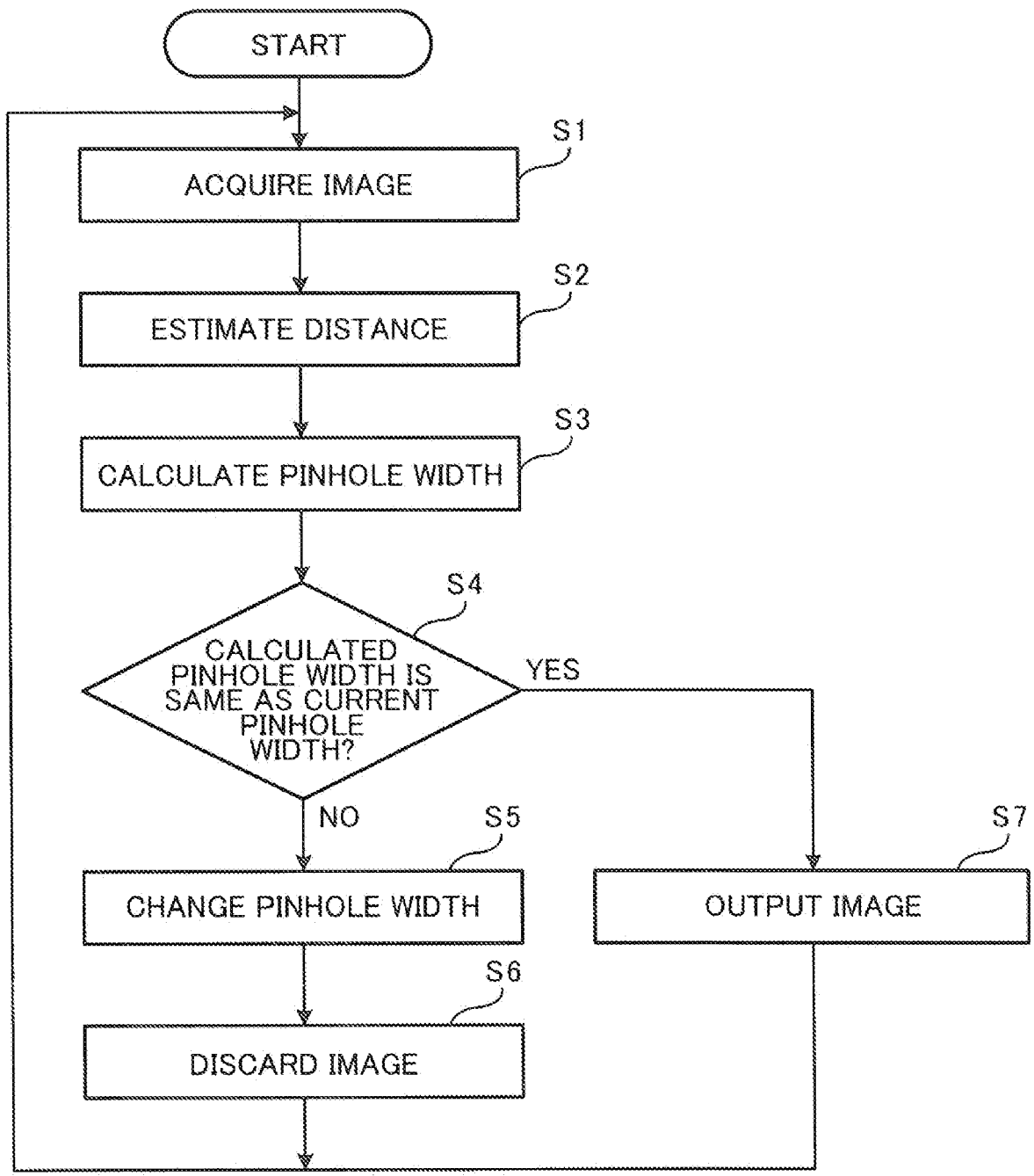
FIG. 7 is a flowchart for describing control processing in a control device in the first embodiment of the present disclosure.

FIG. 7 is a flowchart for describing the control processing in the control device 2 according to the first embodiment of the present disclosure. Note that the flowchart illustrated in FIG. 7 is executed at a predetermined sampling cycle. The predetermined sampling cycle is, for example, a frame cycle of the imaging device 3.

First, in Step S1, the image acquisition unit 21 acquires an image obtained by imaging by the imaging device 3.

Next, in Step S2, by inputting the image acquired by the image acquisition unit 21 to the recognition model read from the recognition model storage unit 22, the image recognition unit 231 estimates a distance between the subject 4 appearing in the image and the imaging device 3. Note that in the first embodiment, the image recognition unit 231 estimates a distance between the subject 4 and the multi-pinhole mask 31 of the imaging device 3.

Next, in Step S3, the pinhole width calculation unit 232 calculates a pinhole width for superimposing subject images based on the distance estimated by the image recognition unit 231 and the reference pinhole width and the reference distance stored in the reference value storage unit 24.

Next, in Step S4, the pinhole control unit 233 determines whether the pinhole width calculated by the pinhole width calculation unit 232 is the same as a current pinhole width or not.

Here, when determination is made that the calculated pinhole width is not the same as the current pinhole width (NO in Step S4), the pinhole control unit 233 changes the current pinhole width to the calculated pinhole width in Step S5. The pinhole control unit 233 outputs a mask control signal for changing the current pinhole width to the calculated pinhole width to the multi-pinhole mask 31. The multi-pinhole mask 31 changes the current pinhole width to the calculated pinhole width by changing the transmittance according to the input mask control signal. At this time, the pinhole control unit 233 outputs a control confirmation signal indicating that the pinhole width has been changed to the output unit 25.

Next, in Step S6, the output unit 25 discards the image obtained by the imaging device 3. When acquiring the control confirmation signal indicating that the pinhole width has been changed, the output unit 25 discards the image obtained by the imaging device 3. When the processing of Step S6 ends, the process returns to processing of Step S1.

By contrast, when determination is made that the calculated pinhole width is the same as the current pinhole width (YES in Step S4), in Step S7, the output unit 25 outputs the image obtained by the imaging device 3 to the captured image storage unit 26. When the processing of Step S7 ends, the process returns to the processing of Step S1. As a result, the image obtained by the imaging device 3 is stored in the captured image storage unit 26. When the determination is made that the calculated pinhole width is the same as the current pinhole width, the pinhole control unit 233 outputs the control confirmation signal indicating that the pinhole width has not been changed to the output unit 25. When acquiring the control confirmation signal indicating that the pinhole width has not been changed, the output unit 25 outputs the image obtained by the imaging device 3 to the captured image storage unit 26.

As described above, in the flowchart shown in FIG. 7, after the processing of Steps S6 and S7 ends, the process returns to the processing of Step S1. In Step S1, the image acquisition unit 21 acquires a new image obtained by new imaging by the imaging device 3. Then, the processing in and after Step S2 illustrated in FIG. 7 is performed again using the new image acquired by the image acquisition unit 21.

In this manner, at least one of a size and an interval of two pinholes 33 among the plurality of pinholes 33 is controlled based on an image obtained by imaging by the imaging device 3 in which the multi-pinhole mask 31 having the plurality of pinholes 33 is arranged so as to cover the light receiving surface of the imaging element 32. Accordingly, by controlling at least one of the size and the interval of the two pinholes 33 among the plurality of pinholes 33 based on an image, an image from which a person has difficulty in visually recognizing a subject is obtained, so that privacy of the subject can be protected even when a distance from the imaging device 3 to the subject changes.

Note that the frame cycle of the imaging device 3 is preferably faster than 30 fps of an ordinary frame cycle. The frame cycle of the imaging device 3 is preferably, for example, 60 fps. As a result, when an unblurred image is obtained, even if the image is discarded, an image obtained in an ordinary frame cycle can be collected. In addition, the captured image storage unit 26 can store a moving image in which privacy of a subject is protected.

Although in the first embodiment, a pinhole width with which subject images satisfy a predetermined overlapping degree is calculated every time an image is acquired, the present disclosure is not particularly limited thereto. When the distance between the subject 4 and the imaging device 3 calculated by the image recognition unit 231 is equal to or longer than the reference distance D stored in advance, the pinhole width may not be changed. In other words, when the distance between the subject 4 and the imaging device 3 calculated by the image recognition unit 231 is shorter than the reference distance D stored in advance, the pinhole width may be calculated and changed. When the distance calculated in Step S2 is shorter than the reference distance D, the processing of Steps S3 to S7 may be performed. In addition, in a case where the distance calculated in Step S2 is equal to or longer than the reference distance D, the processing of Step S7 may be performed without performing the processing of Steps S3 to S6.

Even in a case where the distance between the subject 4 and the imaging device 3 is equal to or longer than the reference distance D, when it is equal to or longer than a reference distance D2 (D<D2), the pinhole width may be changed. Specifically, the pinhole width is not changed when the distance between the subject 4 and the imaging device 3 is longer than or equal to the reference distance D and less than D2, and the pinhole width is increased when the distance between the subject 4 and the imaging device 3 is equal to or longer than the reference distance D2. This is because, if the distance between the subject 4 and the imaging device 3 is too long, the overlapping degree of the subject images becomes so high that contrarily, the subject can be visually recognized with ease.

When the pinhole width calculated by the pinhole width calculation unit 232 is equal to or smaller than the reference pinhole width, the pinhole control unit 233 may change the current pinhole width to the calculated pinhole width. When the pinhole width calculated by the pinhole width calculation unit 232 is equal to or larger than the reference pinhole width, the pinhole control unit 233 may not change the current pinhole width to the calculated pinhole width.

Note that although the distance between the subject 4 and the imaging device 3 in the first embodiment is the distance between the subject 4 and the multi-pinhole mask 31, the present disclosure is not limited thereto, and the distance may be a distance between the subject 4 and the light receiving surface of the imaging element 32. Specifically, in a case where the distance between the subject 4 and the multi-pinhole mask 31 is used as training data during training using machine learning of a recognition model, the image recognition unit 231 calculates the distance between the subject 4 and the multi-pinhole mask 31 from an image. By contrast, in a case where the distance between the subject 4 and the light receiving surface of the imaging element 32 is used as training data during training using machine learning of the recognition model, the image recognition unit 231 calculates the distance between the subject 4 and the light receiving surface of the imaging element 32 from the image.

Although the control unit 23 in the first embodiment controls an interval between two pinholes of the plurality of pinholes based on the image acquired by the image acquisition unit 21, the present disclosure is not particularly limited thereto. The control unit 23 may control sizes of two pinholes among the plurality of pinholes based on the image acquired by the image acquisition unit 21. The control unit 23 may calculate a distance between the subject 4 appearing in an image and the imaging device 3, and control the sizes of the two pinholes based on the distance. When controlling the sizes of the two pinholes, the control unit 23 increases the sizes as the distance between the subject 4 and the imaging device 3 becomes shorter.

The control unit 23 may include a pinhole size calculation unit. The pinhole size calculation unit may calculate a pinhole size for blurring subject images based on the distance between the subject 4 and the imaging device 3 calculated by the image recognition unit 231 and on the reference size and the reference distance stored in the reference value storage unit 24. The reference size is preset. The reference value storage unit 24 stores the reference size and the reference distance.

When the calculated distance is equal to or longer than the reference distance, the pinhole size calculation unit may calculate the reference size as the pinhole size. By contrast, when the calculated distance is shorter than the reference distance, the pinhole size calculation unit may enlarge the reference size at an enlargement ratio corresponding to the calculated distance. For example, assuming that the enlargement ratio in a case where the calculated distance is the reference distance is 1.0 and the enlargement ratio in a case where the calculated distance is 0 is 2.0, the pinhole size calculation unit may change the enlargement ratio between 2.0 and 1.0 according to the calculated distance.

In addition, the pinhole control unit 233 may control sizes of two pinholes among the plurality of pinholes. The pinhole control unit 233 changes the sizes of the two pinholes so as to be the pinhole size calculated by the pinhole size calculation unit. When the calculated pinhole size is the same as the current pinhole size, the pinhole control unit 233 may maintain the current sizes of the two pinholes without changing the sizes of the two pinholes. When the calculated pinhole size is different from the current pinhole size, the pinhole control unit 233 may change the current pinhole size to the calculated pinhole size.

In addition, when changing the pinhole size, the pinhole control unit 233 may change the transmittance of the multi-pinhole mask 31, which is a liquid crystal mask, so as to change the current sizes of the two pinholes to the calculated size. The pinhole control unit 233 may output a mask control signal for changing the current pinhole size to the calculated pinhole size to the multi-pinhole mask 31.

In addition, the pinhole control unit 233 may output a control confirmation signal indicating whether or not the sizes of the two pinholes have been controlled to the output unit 25.

The output unit 25 outputs an image obtained by the imaging device 3 after the sizes of the two pinholes are controlled to the captured image storage unit 26. In other words, the output unit 25 may store, in the captured image storage unit 26, the image obtained by the imaging device 3 after the sizes of the two pinholes are controlled.

In a case where the control confirmation signal indicating that the sizes of the two pinholes have been controlled is input, the output unit 25 may not output the image obtained by the imaging device 3 to the captured image storage unit 26. When the sizes of the two pinholes are changed, the output unit 25 may discard the image obtained by the imaging device 3 without outputting the image to the captured image storage unit 26.

By contrast, in a case where the control confirmation signal indicating that the sizes of the two pinholes have not been controlled is input, the output unit 25 may output the image obtained by the imaging device 3 to the captured image storage unit 26. When the sizes of the two pinholes have not been changed, the output unit 25 may output the image obtained by the imaging device 3 to the captured image storage unit 26.

In addition, the control unit 23 may control both a size and an interval of two pinholes among the plurality of pinholes based on the image acquired by the image acquisition unit 21. The control unit 23 may calculate a distance between the subject 4 appearing in the image and the imaging device 3, and control both the size and the interval of the two pinholes based on the distance.

Second Embodiment

The control device 2 according to the first embodiment superimposes subject images by decreasing an interval between two pinholes as a distance between the subject 4 appearing in the image and the imaging device 3 is shorter. However, as the interval between the two pinholes becomes shorter, the overlapping degree of the two subject images becomes higher, so that the two subject images might substantially overlap into one to allow a person to visually recognize the subject.

Therefore, when a calculated interval between two pinholes is shorter than a threshold, a control device in a second embodiment controls sizes of the two pinholes instead of controlling the interval between the two pinholes.

Figure 8:
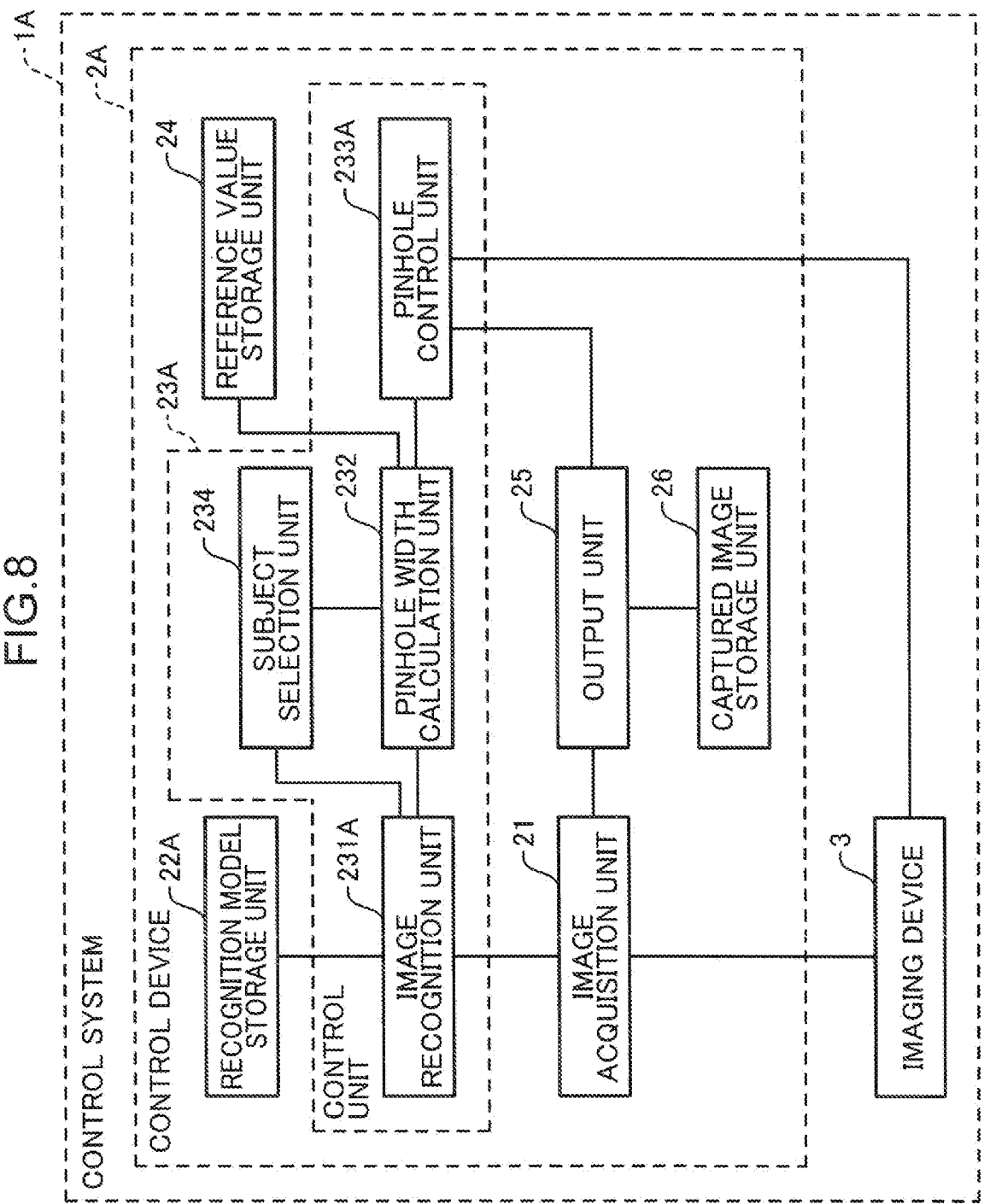
FIG. 8 is a block diagram illustrating an example of an overall configuration of a control system in a second embodiment of the present disclosure.

FIG. 8 is a block diagram illustrating an example of an overall configuration of a control system 1A according to the second embodiment of the present disclosure. In the second embodiment, the same components as those in the first embodiment will be denoted by the same reference signs as those in the first embodiment, and description thereof will be omitted.

The control system 1A includes a control device 2A and the imaging device 3. The control device 2A includes the image acquisition unit 21, a recognition model storage unit 22A, a control unit 23A, the reference value storage unit 24, the output unit 25, and the captured image storage unit 26.

In a case where a plurality of subjects 4 are appearing in an image, the control unit 23A calculates a distance between each of the plurality of subjects 4 and the imaging device 3, and controls at least one of a size and an interval of two pinholes based on the distance between the subject 4 having the shortest calculated distance and the imaging device 3.

The control unit 23A also calculates an interval to be controlled between the two pinholes based on an image, and in a case where the calculated interval is shorter than the threshold, makes the sizes of the two pinholes larger than the current sizes, and in a case where the calculated interval is equal to or longer than the threshold, makes the interval between the two pinholes shorter than the current interval. In a pinhole camera, a blurred image is obtained as a diameter of a pinhole increases. Therefore, the control unit 23A obtains a blurred image enabling protection of privacy by making the sizes of the two pinholes larger than the current sizes.

The control unit 23A includes an image recognition unit 231A, the pinhole width calculation unit 232, a pinhole control unit 233A, and a subject selection unit 234.

The recognition model storage unit 22A stores in advance a recognition model (estimation model) trained using machine learning so as to use an image showing the subject 4 obtained by the imaging device 3 as an input and to output a distance between the subject 4 and the imaging device 3 and a position of the subject 4 on the image.

The image recognition unit 231A calculates the distance between the subject 4 and the imaging device 3 and detects the position of the subject 4 on the image by inputting the image acquired by the image acquisition unit 21 to the recognition model read from the recognition model storage unit 22A. The image recognition unit 231A estimates the distance between the subject 4 and the imaging device 3 and the position of the subject 4 on the image from the image. The position of the subject 4 on the image is represented by a rectangular line surrounding the subject 4 on the image or by a line surrounding an outer edge of the subject 4 on the image.

Note that in a case where a plurality of subjects 4 appear in the image, the image recognition unit 231A estimates a position of each of the plurality of subjects 4 and estimates a distance between each of the plurality of subjects 4 and the imaging device 3.

Although in the second embodiment, the recognition model storage unit 22A stores one recognition model for estimating a distance and a position, the present disclosure is not particularly limited thereto. The recognition model storage unit 22A may store a first recognition model for estimating a distance and a second recognition model for estimating a position.

In a case where positions of a plurality of subjects 4 are estimated on the image by the image recognition unit 231A, the subject selection unit 234 selects the subject 4 having the shortest calculated distance from among the plurality of subjects 4 on the image. In other words, when the plurality of subjects 4 appear in the image, the closest subject 4 is selected from among the plurality of subjects 4.

The pinhole width calculation unit 232 calculates an interval (pinhole width) between two pinholes based on a distance between the subject 4 having the shortest calculated distance and the imaging device 3.

The pinhole control unit 233A determines whether the pinhole width calculated by the pinhole width calculation unit 232 is smaller than the threshold or not. The threshold is an interval at which a person has difficulty in visually recognizing a subject, and is, for example, an interval at which an overlapping degree between two subject images on the light receiving surface of the imaging element 32 is 90%.

When the calculated pinhole width is smaller than the threshold, the pinhole control unit 233A changes the sizes of the two pinholes to be larger than the current sizes. At this time, the pinhole control unit 233A enlarges the sizes of the two pinholes at a predetermined enlargement ratio. When the calculated pinhole width is equal to or larger than the threshold, the pinhole control unit 233A changes the current pinhole width to the calculated pinhole width.

The output unit 25 outputs, to the captured image storage unit 26, an image obtained by the imaging device 3 after the interval or the sizes of the two pinholes are controlled. In other words, the output unit 25 stores, in the captured image storage unit 26, the image obtained by the imaging device 3 after the interval or the sizes of the two pinholes are controlled.

Next, control processing in the control device 2A according to the second embodiment of the present disclosure will be described.

Figure 9:
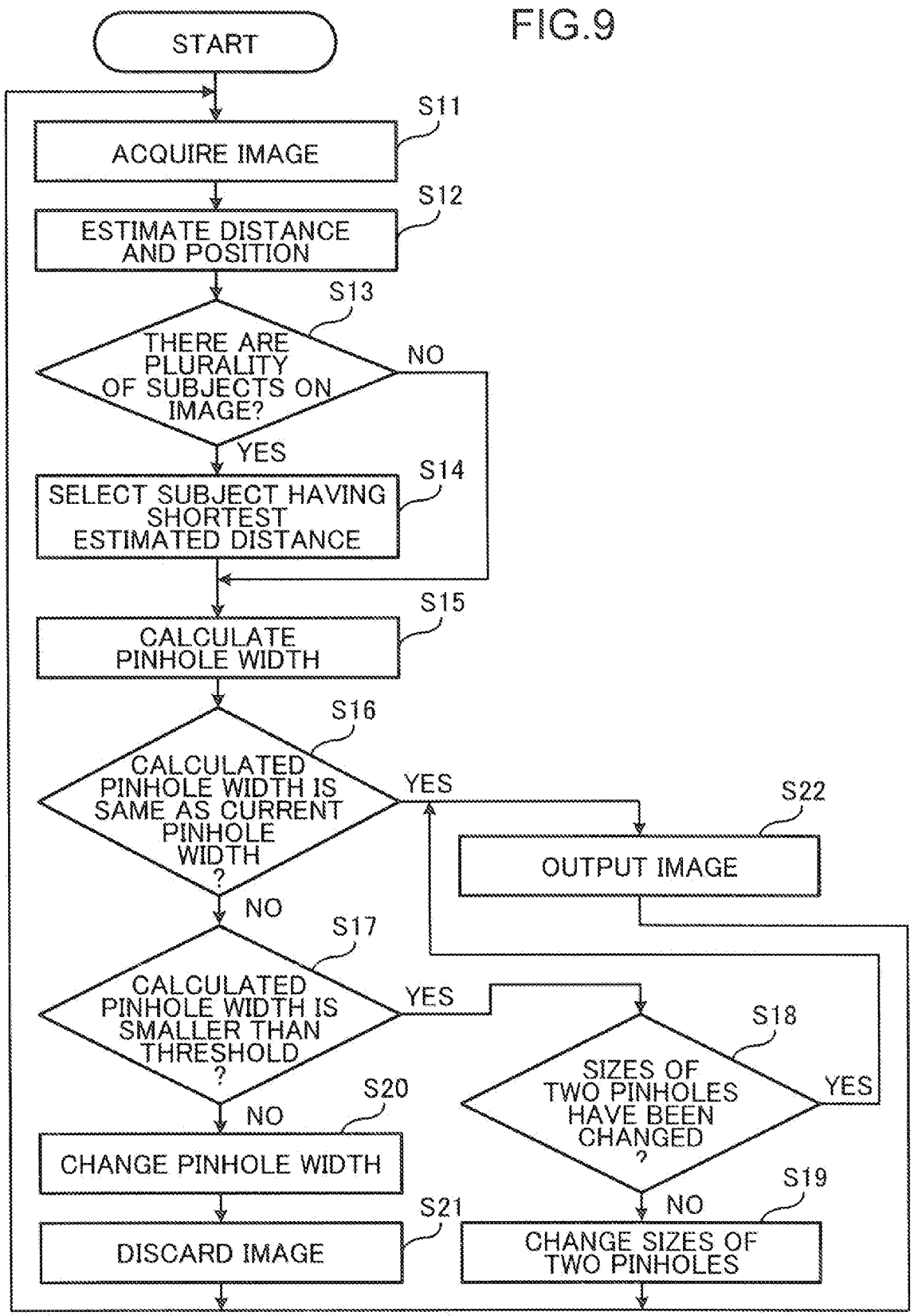
FIG. 9 is a flowchart for describing control processing in a control device in the second embodiment of the present disclosure.

FIG. 9 is a flowchart for describing the control processing in the control device 2A according to the second embodiment of the present disclosure. Note that the flowchart illustrated in FIG. 9 is executed at a predetermined sampling cycle. The predetermined sampling cycle is, for example, a frame cycle of the imaging device 3.

First, in Step S11, the image acquisition unit 21 acquires an image obtained by imaging by the imaging device 3.

Next, in Step S12, the image recognition unit 231A estimates a distance between the subject 4 appearing in the image and the imaging device 3 and a position of the subject 4 in the image by inputting the image acquired by the image acquisition unit 21 to a recognition model read from the recognition model storage unit 22A.

Next, in Step S13, the subject selection unit 234 determines whether or not there are a plurality of subjects on the image based on the position of the subject 4 in the image estimated by the image recognition unit 231A. Here, when determination is made that there are not a plurality of subjects on the image (NO in Step S13), the process proceeds to processing of Step S15.

On the other hand, when determination is made that there are a plurality of subjects on the image (YES in Step S13), in Step S14, the subject selection unit 234 selects the subject 4 having the shortest distance estimated by the image recognition unit 231A from the plurality of subjects 4 on the image.

Next, in Step S15, the pinhole width calculation unit 232 calculates a pinhole width for superimposing subject images based on the distance estimated by the image recognition unit 231A and a reference pinhole width and a reference distance stored in the reference value storage unit 24. At this time, when only one subject is present on the image, the pinhole width calculation unit 232 calculates a pinhole width for superimposing subject images based on a distance between one subject and the imaging device 3 and on the reference pinhole width and the reference distance stored in the reference value storage unit 24. By contrast, when a plurality of subjects are present on the image, the pinhole width calculation unit 232 calculates the pinhole width for superimposing subject images based on a distance between a subject having the shortest estimated distance and the imaging device 3, and on the reference pinhole width and the reference distance stored in the reference value storage unit 24.

Next, in Step S16, the pinhole control unit 233A determines whether the pinhole width calculated by the pinhole width calculation unit 232 is the same as a current pinhole width or not.

Here, when determination is made that the calculated pinhole width is the same as the current pinhole width (YES in Step S16), in Step S22, the output unit 25 outputs the image obtained by the imaging device 3 to the captured image storage unit 26. When the processing of Step S22 ends, the process returns to the processing of Step S11. As a result, the image obtained by the imaging device 3 is stored in the captured image storage unit 26.

By contrast, when determination is made that the calculated pinhole width is not the same as the current pinhole width (NO in Step S16), the pinhole control unit 233A determines whether the pinhole width calculated by the pinhole width calculation unit 232 is smaller than a threshold or not in Step S17.

Here, when determination is made that the calculated pinhole width is smaller than the threshold (YES in Step S17), the pinhole control unit 233A determines whether or not the sizes of the two pinholes have been changed from a reference size in Step S18.

Here, when determination is made that the sizes of the two pinholes have been changed from the reference size (YES in Step S18), in Step S22, the output unit 25 outputs the image obtained by the imaging device 3 to the captured image storage unit 26.

By contrast, when determination is made that the sizes of the two pinholes have not been changed from the reference size (NO in Step S18), in Step S19, the pinhole control unit 233A changes the sizes of the two pinholes to be larger than the current sizes. When the processing of Step S19 ends, the process returns to the processing of Step S11. The pinhole control unit 233A outputs a mask control signal for enlarging the sizes of the two pinholes at a predetermined enlargement ratio to the multi-pinhole mask 31 while maintaining the current pinhole width. The multi-pinhole mask 31 changes the sizes of the two pinholes by changing a transmittance according to the input mask control signal. At this time, the pinhole control unit 233A outputs the control confirmation signal indicating that the sizes of the two pinholes have been changed to the output unit 25.

When determination is made that the calculated pinhole width is equal to or larger than the threshold (NO in Step S17), the pinhole control unit 233A changes the current pinhole width to the calculated pinhole width in Step S20. At this time, when the sizes of the two pinholes have been changed from the reference size, the pinhole control unit 233A changes the sizes of the two pinholes to the reference size, and changes the current pinhole width to the calculated pinhole width.

Note that the processing of Steps S20 and S21 is the same as the processing of Steps S5 and S6 illustrated in FIG. 7, and thus description thereof is omitted. When the processing of Step S21 ends, the process returns to the processing of Step S11.

As described above, in the flowchart shown in FIG. 9, after the processing of Steps S19, S21 and S22 ends, the process returns to Step S11. In Step S11, the image acquisition unit 21 acquires a new image obtained by new imaging by the imaging device 3. Then, the processing in and after Step S12 illustrated in FIG. 9 is performed again using the new image acquired by the image acquisition unit 21.

As described above, as the interval between the two pinholes 33 becomes shorter, the overlapping degree of the two subject images on the light receiving surface of the imaging element 32 becomes higher, so that the two subject images might substantially overlap into one to allow a person to visually recognize the subject. However, according to the second embodiment, when the calculated pinhole width is smaller than the threshold, the pinhole width is not controlled, but the sizes of the two pinholes are controlled to be larger than the current sizes. Therefore, even if the overlapping degree between the two subject images on the light receiving surface of the imaging element 32 increases, it is possible to obtain an image from which a person has difficulty in visually recognizing a subject.

Although in the second embodiment, the pinhole control unit 233A enlarges the sizes of the two pinholes at the predetermined enlargement ratio, the present disclosure is not particularly limited thereto, and the current sizes of the two pinholes may be changed to a predetermined size larger than the reference size.

In addition, the pinhole control unit 233A may determine the enlargement ratio according to a difference value between the calculated pinhole width and the current pinhole width, and may enlarge the sizes of the two pinholes at the determined enlargement ratio. In this case, the pinhole control unit 233A may increase the enlargement ratio as the difference value increases.

In addition, similarly to the second embodiment, in a case where a plurality of subjects 4 are appearing in an image, the control unit 23 in the first embodiment may calculate a distance between each of the plurality of subjects 4 and the imaging device 3, and control at least one of a size and an interval of two pinholes based on a distance between the subject 4 having the shortest calculated distance and the imaging device 3.

Third Embodiment

The control device 2 according to the first embodiment superimposes subject images by decreasing a pinhole width as a distance between the subject 4 appearing in the image and the imaging device 3 is smaller. However, even if the pinhole width is changed to be smaller, an image that has a low degree of blurring and enables a person to visually recognize a subject may be acquired.

Therefore, after controlling one of a size and an interval of two pinholes, a control device in a third embodiment controls uncontrolled one of the size and the interval of the two pinholes in a case where a degree of blurring of an image acquired by the image acquisition unit 21 is equal to or lower than the threshold.

Figure 10:
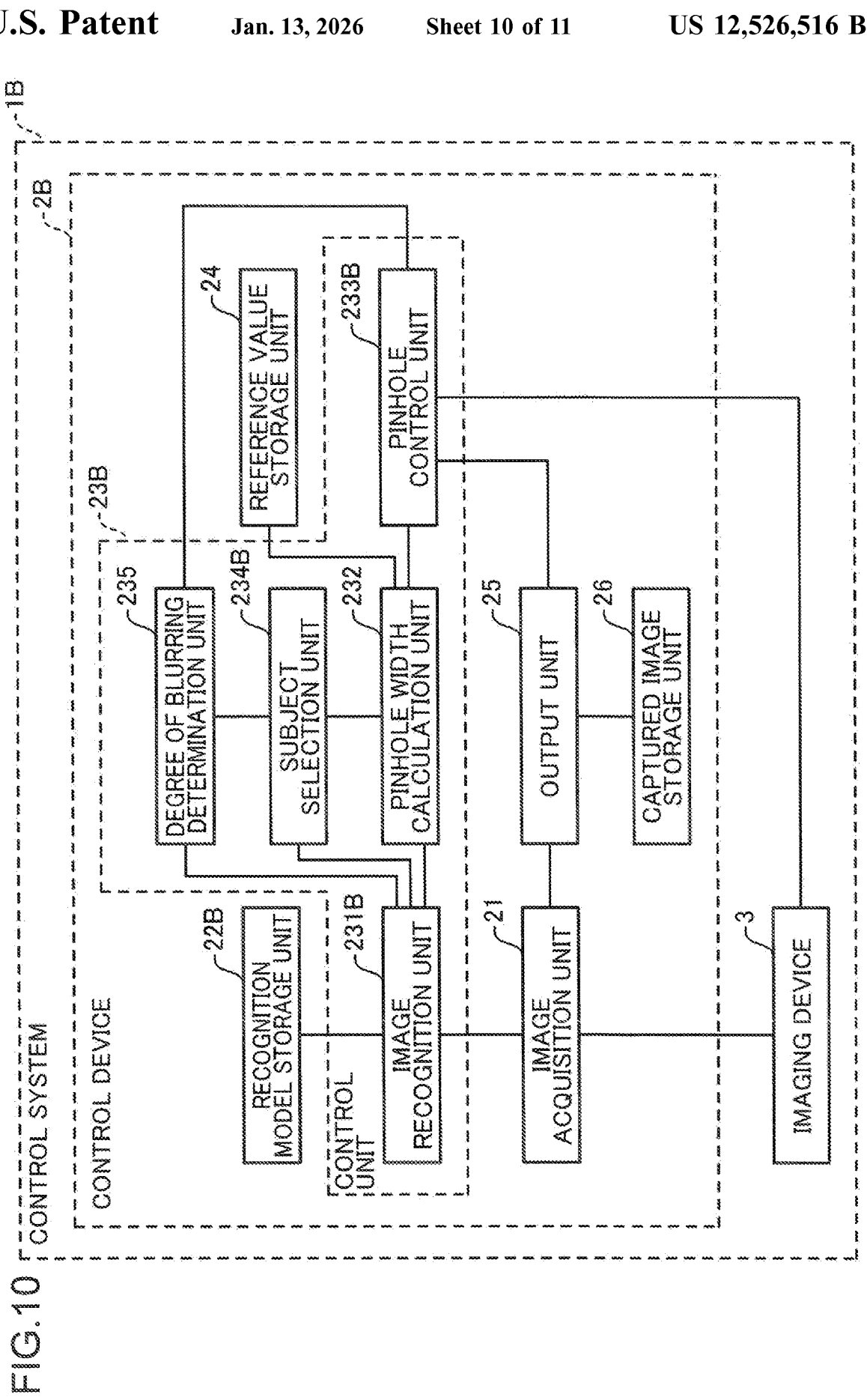
FIG. 10 is a block diagram illustrating an example of an overall configuration of a control system in a third embodiment of the present disclosure.

FIG. 10 is a block diagram illustrating an example of an overall configuration of a control system 1B according to the third embodiment of the present disclosure. In the third embodiment, the same configurations as those in the first embodiment and the second embodiment are denoted by the same reference signs, and description thereof will be omitted.

The control system 1B includes a control device 2B and the imaging device 3. The control device 2B includes the image acquisition unit 21, a recognition model storage unit 22B, a control unit 23B, the reference value storage unit 24, the output unit 25, and the captured image storage unit 26.

In a case where a plurality of subjects 4 are appearing in an image, the control unit 23B calculates a distance between each of the plurality of subjects 4 and the imaging device 3, and controls at least one of a size and an interval of two pinholes based on a distance between the subject 4 having the shortest calculated distance and the imaging device 3.

The control unit 23B also calculates a degree of blurring of the subject 4 appearing in the image, and controls at least one of the size and the interval between the two pinholes based on the degree of blurring. After controlling one of the size and the interval of the two pinholes, the control unit 23B calculates the degree of blurring of the subject 4 appearing in the image, and in a case where the degree of blurring is equal to or lower than a threshold, controls uncontrolled one of the size and the interval of the two pinholes. In other words, after controlling the interval of the two pinholes, the control unit 23B calculates the degree of blurring of the subject 4 appearing in the image, and in a case where the degree of blurring is equal to or lower than the threshold, controls the sizes of the two pinholes. Note that after controlling the sizes of the two pinholes, the control unit 23B may calculate the degree of blurring of the subject 4 appearing in the image, and in a case where the degree of blurring is equal to or lower than the threshold, may control the interval between the two pinholes. The control unit 23B calculates the degree of blurring by inputting an acquired image to a recognition model trained using machine learning so as to use an image showing the subject 4 as an input and to output the degree of blurring of the subject appearing in the image.

As described above, in a pinhole camera, a more blurred image is obtained as a diameter of the pinhole increases. Therefore, in a case where even when the interval between two pinholes is changed, an image having a high degree of blurring cannot be obtained, the control unit 23B obtains a blurred image enabling protection of privacy by making the size of the pinhole larger than the current size.

The control unit 23B includes an image recognition unit 231B, the pinhole width calculation unit 232, a pinhole control unit 233B, a subject selection unit 234B, and a degree of blurring determination unit 235.

The recognition model storage unit 22B stores in advance a recognition model (estimation model) trained using machine learning so as to use an image showing the subject 4 obtained by the imaging device 3 as an input and to output a distance between the subject 4 and the imaging device 3, a position of the subject 4 on the image, and a degree of blurring.

The image recognition unit 231B calculates the distance between the subject 4 and the imaging device 3, detects the position of the subject 4 on the image, and calculates the degree of blurring of the subject 4 appearing in the image by inputting the image acquired by the image acquisition unit 21 to the recognition model read from the recognition model storage unit 22B. The image recognition unit 231B estimates, from the image, the distance between the subject 4 and the imaging device 3, the position of the subject 4 on the image, and the degree of blurring of the subject 4 appearing in the image. The position of the subject 4 on the image is represented by a rectangular line surrounding the subject 4 on the image or by a line surrounding an outer edge of the subject 4 on the image. The degree of blurring is represented by 0 to 100%, for example, and is an index indicating how much the subject 4 appearing in the image is blurred. The higher the degree of blurring becomes, the more difficult it is for a person to visually recognize a subject.

Note that in a case where a plurality of subjects 4 appear in the image, the image recognition unit 231B estimates a position of each of the plurality of subjects 4, estimates a distance between each of the plurality of subjects 4 and the imaging device 3, and estimates a degree of blurring of each of the plurality of subjects 4.

Although in the third embodiment, the recognition model storage unit 22B stores one recognition model for estimating a distance, a position, and a degree of blurring, the present disclosure is not particularly limited thereto. The recognition model storage unit 22B may store a first recognition model for estimating a distance, a second recognition model for estimating a position, and a third recognition model for estimating a degree of blurring.

The degree of blurring determination unit 235 determines whether the pinhole width has been changed last time. When determining that the pinhole width has been changed last time, the degree of blurring determination unit 235 determines whether the degree of blurring calculated by the image recognition unit 231B is equal to or lower than the threshold. The threshold is a degree of blurring for identifying whether or not a person can visually recognize a subject. In a case where the degree of blurring calculated by the image recognition unit 231B is equal to or lower than the threshold, a person can visually recognize the subject. In addition, in a case where the degree of blurring calculated by the image recognition unit 231B is higher than the threshold, a person has difficulty in visually recognizing the subject.

In a case where the degree of blurring determination unit 235 determines that the pinhole width has not been changed last time and the image recognition unit 231B estimates positions of the plurality of subjects 4 on the image, the subject selection unit 234B selects the subject 4 having the shortest calculated distance from among the plurality of subjects 4 on the image. In addition, in a case where the degree of blurring determination unit 235 determines that the degree of blurring is higher than the threshold and the image recognition unit 231B estimates the positions of the plurality of subjects 4 on the image, the subject selection unit 234B selects the subject 4 having the shortest calculated distance from among the plurality of subjects 4 on the image. In other words, when the plurality of subjects 4 appear in the image, the closest subject 4 is selected from among the plurality of subjects 4.

When the degree of blurring determination unit 235 determines that the degree of blurring is equal to or lower than the threshold, the pinhole control unit 233B changes the sizes of the two pinholes to be larger than the current sizes. At this time, the pinhole control unit 233B enlarges the sizes of the two pinholes at a predetermined enlargement ratio. When the degree of blurring determination unit 235 determines that the degree of blurring is higher than the threshold, the pinhole control unit 233B changes a current pinhole width to a calculated pinhole width.

The pinhole control unit 233B turns on a pinhole width control flag when controlling the interval between the two pinholes, and turns off the pinhole width control flag when not controlling the interval between the two pinholes. The degree of blurring determination unit 235 refers to the pinhole width control flag to determine whether the pinhole width has been changed last time or not.

The output unit 25 outputs, to the captured image storage unit 26, an image obtained by the imaging device 3 after the interval or the sizes of the two pinholes are controlled. In other words, the output unit 25 stores, in the captured image storage unit 26, the image obtained by the imaging device 3 after the interval or the sizes of the two pinholes are controlled.

Next, control processing in the control device 2B according to the third embodiment of the present disclosure will be described.

Figure 11:
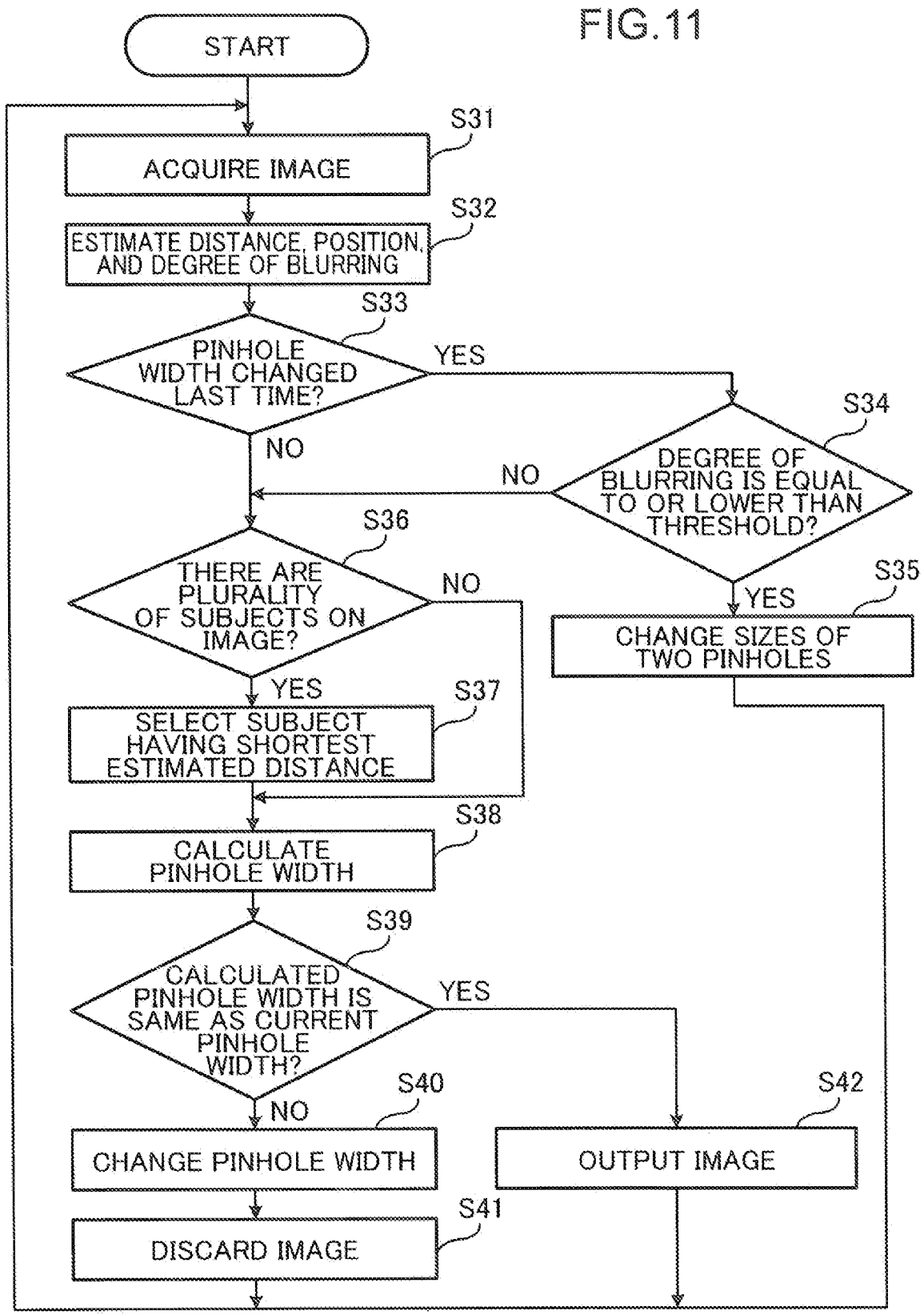
FIG. 11 is a flowchart for describing control processing in a control device in the third embodiment of the present disclosure.

FIG. 11 is a flowchart for describing the control processing in the control device 2B according to the third embodiment of the present disclosure. Note that the flowchart illustrated in FIG. 11 is executed at a predetermined sampling cycle. The predetermined sampling cycle is, for example, a frame cycle of the imaging device 3.

First, in Step S31, the image acquisition unit 21 acquires an image obtained by imaging by the imaging device 3.

Next, in Step S32, the image recognition unit 231B estimates a distance between the subject 4 appearing in the image and the imaging device 3, a position of the subject 4 in the image, and a degree of blurring of the subject 4 appearing in the image by inputting the image acquired by the image acquisition unit 21 to a recognition model read from the recognition model storage unit 22.

Next, in Step S33, the degree of blurring determination unit 235 determines whether the pinhole width has been changed last time or not. Here, when determining that the pinhole width has been changed last time (YES in Step S33), the degree of blurring determination unit 235 determines whether or not the degree of blurring estimated by the image recognition unit 231B is equal to or lower than a threshold in Step S34.

Here, when determination is made that the degree of blurring is equal to or lower than the threshold (YES in Step S34), the pinhole control unit 233B changes the sizes of the two pinholes to be larger than the current sizes in Step S35. The pinhole control unit 233B outputs a mask control signal for enlarging the two pinholes at a predetermined enlargement ratio to the multi-pinhole mask 31 while maintaining a current pinhole width. The multi-pinhole mask 31 changes the sizes of the two pinholes by changing a transmittance according to the input mask control signal. At this time, the pinhole control unit 233B outputs the control confirmation signal indicating that the sizes of the two pinholes have been changed to the output unit 25. After the processing of Step S35 ends, the process returns to the processing of Step S31.

Note that in a case where there are a plurality of subjects on the image, the degree of blurring determination unit 235 determines whether or not the degree of blurring of each of the plurality of subjects is equal to or lower than the threshold. Then, in a case where the degree of blurring of at least one subject is equal to or lower than the threshold, the process proceeds to the processing of Step S35, and in a case where the degrees of blurring of all subjects are higher than the threshold, the process proceeds to the processing of Step S36.

By contrast, when determination is made that the pinhole width has not been changed last time (NO in Step S33) or when determination is made that the degree of blurring is higher than the threshold (NO in Step S34), in Step S36, the subject selection unit 234B determines whether or not there are a plurality of subjects on the image based on the position of the subject 4 in the image estimated by the image recognition unit 231B.

The processing of Steps S36 to S39 is the same as the processing of Steps S13 to S16 illustrated in FIG. 9, and thus description thereof is omitted.

When determination is made that the calculated pinhole width is not the same as the current pinhole width (NO in Step S39), the pinhole control unit 233B changes the current pinhole width to the calculated pinhole width in Step S40. At this time, when the sizes of the two pinholes have been changed from a reference size, the pinhole control unit 233B changes the sizes of the two pinholes to the reference size, and changes the current pinhole width to the calculated pinhole width.

The processing of Steps S40 to S42 is the same as the processing of Steps S5 to S7 illustrated in FIG. 7, and thus description thereof is omitted. After the processing of Step S41 ends, the process returns to the processing of Step S31, and after the processing of Step S42 ends, the process returns to the processing of Step S31.

As described above, in the flowchart shown in FIG. 11, after the processing of Steps S35, S41 and S42 ends, the process returns to the processing of Step S31. In Step S31, the image acquisition unit 21 acquires a new image obtained by new imaging by the imaging device 3. Then, the processing in and after Step S32 illustrated in FIG. 11 is performed again using the new image acquired by the image acquisition unit 21.

According to the third embodiment, even if the degree of blurring of the subject appearing in the image is equal to or lower than the threshold after one of the size and the interval of the two pinholes 33 is controlled, the uncontrolled one of the size and the interval of the two pinholes 33 is controlled, so that the degree of blurring of the subject appearing in the image can be increased, thereby enabling an image from which a person has difficulty in visually recognizing the subject to be obtained.

Although in the third embodiment, the pinhole control unit 233B enlarges the sizes of the two pinholes at a predetermined enlargement ratio, the present disclosure is not particularly limited thereto, and the current sizes of the two pinholes may be changed to a predetermined size larger than the reference size.

Since the technique according to the present disclosure enables protection of privacy of a subject even when a distance from an imaging device to the subject changes, this technique is useful for a technique of controlling an imaging device in which a mask having a plurality of pinholes is arranged so as to cover a light receiving surface of an imaging element.

The invention claimed is:

1. A control device comprising:
an acquisition unit that acquires an image obtained by imaging by an imaging device in which a mask having a plurality of pinholes is arranged so as to cover a light receiving surface of an imaging element;
a control unit that outputs to the mask a mask control signal for changing at least one of a size and an interval of two pinholes among the plurality of pinholes based on the image such that two subject images obtained through the two pinholes among the plurality of pinholes are overlapped with each other while being shifted from each other by a predetermined degree even when a distance between a subject appearing in the image and the imaging device changes, the mask being configured to change at least one of the size and the interval of the two pinholes according to the mask control signal; and
an output unit that outputs an image obtained by the imaging device after at least one of the size and the interval of the two pinholes is changed.

2. The control device according to claim 1, wherein
the control unit calculates the distance between the subject appearing in the image and the imaging device, and outputs to the mask the mask control signal for changing at least one of the size and the interval of the two pinholes based on the distance.

3. The control device according to claim 2, wherein
the control unit calculates the distance by inputting the acquired image to an estimation model trained using machine learning so as to use the image showing the subject as an input and to output the distance between the subject and the imaging device.

4. The control device according to claim 2, wherein
when changing the size, the control unit outputs to the mask the mask control signal for increasing the size as the distance is shorter, and when changing the interval, outputs to the mask the mask control signal for decreasing the interval as the distance is shorter.

5. The control device according to claim 1, wherein
the control unit calculates an interval to be changed between the two pinholes based on the image, and in a case where the calculated interval is shorter than a threshold, outputs to the mask the mask control signal for making the size larger and in a case where the calculated interval is equal to or longer than the threshold, outputs to the mask the mask control signal for decreasing the interval.

6. The control device according to claim 1, wherein
the control unit calculates a degree of blurring of the subject appearing in the image and outputs to the mask the mask control signal for changing at least one of the size and the interval of the two pinholes based on the degree of blurring.

7. The control device according to claim 6, wherein
the control unit calculates the degree of blurring by inputting the acquired image to an estimation model trained using machine learning so as to use the image showing the subject as an input and to output the degree of blurring of the subject appearing in the image.

8. The control device according to claim 1, wherein
after changing one of the size and the interval of the two pinholes, the control unit calculates a degree of blurring of the subject appearing in the image, and in a case where the degree of blurring is equal to or lower than a threshold, outputs to the mask the mask control signal for changing an unchanged one of the size and the interval of the two pinholes.

9. The control device according to claim 1, wherein
in a case where a plurality of subjects are appearing in the image, the control unit calculates a distance between each of the plurality of subjects and the imaging device, and outputs to the mask the mask control signal for changing at least one of the size and the interval of the two pinholes based on the distance between the subject having the shortest calculated distance and the imaging device.

10. The control device according to claim 1, wherein
the image output by the output unit is a new image obtained by new imaging by the imaging device and acquired by the acquisition unit after at least one of the size and the interval of the two pinholes is changed by the control unit.

11. A control method comprising, by a computer:
acquiring an image obtained by imaging by an imaging device in which a mask having a plurality of pinholes is arranged so as to cover a light receiving surface of an imaging element;
outputting to the mask a mask control signal for changing at least one of a size and an interval of two pinholes among the plurality of pinholes based on the image such that two subject images obtained through the two pinholes among the plurality of pinholes are overlapped with each other while being shifted from each other by a predetermined degree even when a distance between a subject appearing in the image and the imaging device changes, the mask being configured to change at least one of the size and the interval of the two pinholes according to the mask control signal; and
outputting an image obtained by the imaging device after at least one of the size and the interval of the two pinholes is changed.

\* \* \* \* \*